No. 802,641. PATENTED OCT. 24, 1905.
B. S. HAWLEY.
GAGED SAMPLE BOTTLE.
APPLICATION FILED DEC. 20, 1904.
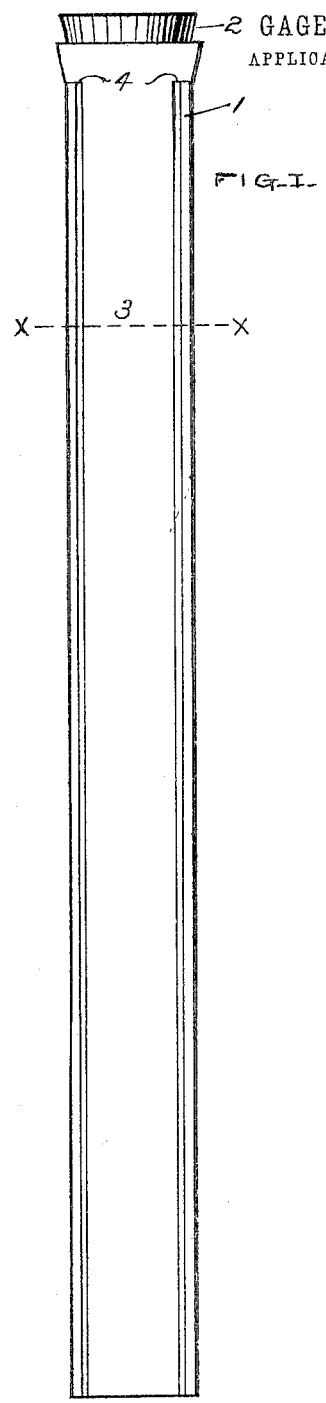
FIG. I.
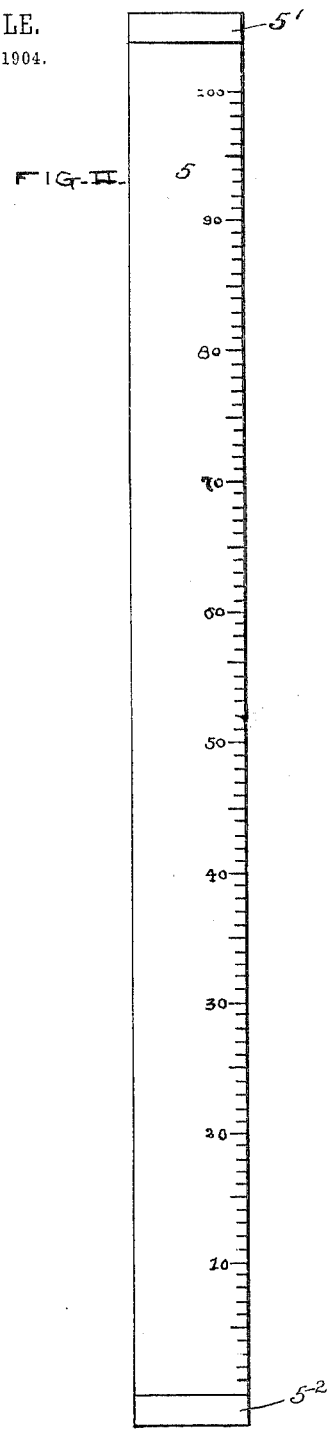
FIG. II.
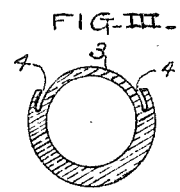
FIG. III.
Witnesses
R. Roszell Duffie.
John P. Duffie.
B. S. Hawley, Inventor
by John S. Duffie, Attorney

UNITED STATES PATENT OFFICE.

BERTON S. HAWLEY, OF ANGELO, WISCONSIN.

GAGED SAMPLE-BOTTLE.

No. 802,641.  Specification of Letters Patent.  Patented Oct. 24, 1905.

Application filed December 20, 1904. Serial No. 237,662.

*To all whom it may concern:*

Be it known that I, BERTON S. HAWLEY, a citizen of the United States, residing at the town of Angelo, in the county of Monroe and State of Wisconsin, have invented new and useful Improvements in Gaged Sample-Bottles, of which the following is a specification.

My invention is a gaged sample-bottle, and has for its object to provide a means whereby samples of either milk or cream may be taken in order to perform a composite test to determine the amount of butter-fat in any quantity of such cream or milk.

In the accompanying drawings, Figure 1 is an elevation of my bottle provided with a vertical recess and grooves to hold and receive a graduated plate. Fig. 2 is an elevation of the graduated plate adapted to fit in the recess and grooves shown in Fig. 1. Fig. 3 is a cross-sectional view on the line X X of Fig. 1.

My invention is described as follows:

The numeral 1 represents my bottle having in the top thereof a stopper 2. This bottle is preferably about eleven inches long. Formed into the face of the bottle and running its entire length is a longitudinal recess 3, and formed one in each edge of the said recess 3 are two vertically-running grooves 4, the said grooves being the entire length of the bottle except the neck. A graduated plate 5 is fitted into the said recess 3 and grooves 4, the said plate being made somewhat longer than the length of the bottle, so that after the said plate is fitted into the recess 3 and grooves 4 the ends 5' and 5² of the same may be turned sufficiently inward to overlap the top and bottom of the said bottle, thus preventing the said graduated plate from slipping up or down. This plate 5 is divided into one hundred parts. This done the bottle is ready for use.

As stated heretofore, my bottle will be used for the purpose of taking samples of either cream or milk, and from such samples will be made a composite test to determine the amount of butter-fat in any quantity of such cream or milk. The object of providing my bottle with a gage is to enable the person who takes these samples to take in all cases a quantity as a sample in the exact proportion to the amount or quantities from which the samples are taken in order to make a correct composite test. For an illustration we will say that A is gathering cream among the farmers to be delivered to the creamery or butter-factory. A calls at B's upon Tuesday and gets fifty pounds of cream and fills his sample-bottle up to the gage marked "50" and upon Friday calls again and fills another sample-bottle up to the gage marked "100" and gets one hundred pounds of cream, and so on for a period of, say, one month, and at the end of that time these samples of cream are taken from the sample-bottles and thoroughly mixed together, and from this mixture of cream or milk, as the case may be, there is taken another sample and placed in the Babcock test or some other reliable testing-machine to determine the amount of butter-fat contained therein. In this way may be determined the correct amount of butter-fat in any quantity of milk or cream. It does not matter what the quality of the cream or milk may be the result will be correct if the samples are taken in this way and the test properly made. Of course the cream or milk should always be well mixed before taking a sample. I will now illustrate how this method will work in actual practice. We will say that B has fifty pounds of cream on Tuesday, which contains and will test thirty per cent. of butter-fat, and on Friday of the same week he has one hundred pounds of cream that for some reason contains but fifteen per cent. of butter-fat and will test only that amount. A, who gathers cream, will fill on Tuesday a sample-bottle one-half full or an amount that will fill the sample-bottle up to the gage marked "50," and on Friday, when he gets one hundred pounds of cream, he will fill another sample-bottle up full or to the gage marked "100." Thus we see that he takes twice as much cream as a sample from the one hundred pounds as he does from the quantity of cream which weighs only fifty pounds. A really takes a sample of cream for every pound of cream which he takes, or in this case we may divide his sample into three parts, one testing thirty per cent. of butter-fat and two testing fifteen per cent. of butter-fat each the average test of which is thirty plus fifteen plus fifteen divided by three, which is twenty per cent. of butter-fat in the one hundred and fifty pounds of cream tested, or thirty pounds of butter-fat in all, which is correct. By taking samples in this way with my gaged sample-bottles and making a proper test the correct composite test can always be made. In striking contrast with this method of taking samples of cream or milk is the method which is now in use at factories where an immense amount of cream and milk is gathered, sampled, and tested and the patrons paid accordingly. It is a method which gives results which are almost invariably incorrect, and the patrons gain or lose in proportion to the error caused by the erroneous method of taking the samples from which a composite test is to be made of the cream or milk thus gathered, as the case may be. This erroneous method is simply taking an equal quantity of cream or milk as samples at all times regardless of the quantity or quality of the cream or milk from which these samples are taken. It is done in the following manner: An equal quantity for samples is taken from, say, fifty pounds of cream testing thirty per cent. of butter-fat and from one hundred pounds of cream testing fifteen per cent. of butter-fat, and the result is thirty plus fifteen divided by two times one hundred and fifty, which equals 33.75 pounds of butter-fat, an error of 3.75 pounds of butter-fat. The fact that two or more quantities of cream or milk, especially cream, very seldom test exactly the same proves that tests made from samples taken in this way are seldom, if ever, correct. These facts presenting themselves to my mind has led me to the idea of manufacturing a bottle for the taking of samples with a gage upon it, as shown in the accompanying drawings. Thus it will be seen that by use of my gage sample-bottle the amount of butter-fat in any quantity or quality of cream may be determined in a much more easy, reliable, and efficient manner than by use of the methods now in vogue.

Having described my invention, what I claim as new, and desire to secure by Letters Patent, is—

1. The combination of a bottle 1, having a longitudinal recess 3, in the face of the same its entire length; two vertically-running grooves 4, one in each edge of said recess; a graduated plate 5, adapted to be fitted into the said recess 3 and grooves 4, the said graduated plate being somewhat longer than the said bottle, so that the ends, $5'$, and $5^2$, of the same, may be turned inwardly, so as to overlap the bottom and top of the said bottle, thereby preventing the said graduated plate 5, from slipping up or down.

2. The combination of a bottle 1, having a longitudinal recess 3, in the face of the same its entire length; two vertically-running grooves 4, one in each edge of said recess, and a graduated plate 5, adapted to be fitted into the said recess 3 and grooves 4.

In testimony whereof I affix my signature in presence of two subscribing witnesses.

BERTON S. HAWLEY.

Witnesses:
R. B. GRAVES,
KATHERINE ROMANOSKY.